United States Patent [19]
Loutfy et al.

[11] Patent Number: 4,465,566
[45] Date of Patent: Aug. 14, 1984

[54] METHOD OF PRODUCING ANHYDROUS ALUMINUM CHLORIDE FROM ACID LEACH-DERIVED ACH AND THE PRODUCTION OF ALUMINUM THEREFROM

[75] Inventors: Raouf O. Loutfy; James C. Withers, both of Tucson, Ariz.

[73] Assignee: Atlantic Richfield Company, Los Angeles, Calif.

[21] Appl. No.: 400,198

[22] Filed: Jul. 20, 1982

[51] Int. Cl.³ .......................... C25C 3/06; C01F 7/58
[52] U.S. Cl. ..................................... 204/67; 423/112; 423/126; 423/132
[58] Field of Search ....................... 423/112, 126, 132; 204/67

[56] References Cited

U.S. PATENT DOCUMENTS

| | | | |
|---|---|---|---|
| 2,249,761 | 7/1941 | Hixson et al. | 423/132 |
| 2,376,696 | 5/1945 | Hixson et al. | 423/132 |
| 3,755,099 | 8/1973 | Haupin | 204/64 |
| 3,842,163 | 10/1974 | Russell et al. | 423/496 |
| 4,039,648 | 8/1977 | Haupin et al. | 423/496 |
| 4,105,752 | 8/1978 | Becker et al. | 423/496 |
| 4,151,061 | 4/1979 | Ishikawa et al. | 204/247 |
| 4,224,287 | 9/1980 | Ziegenbalg et al. | 423/112 |
| 4,235,860 | 11/1980 | Wohleber et al. | 423/495 |
| 4,264,569 | 4/1981 | Sinha | 423/495 |
| 4,284,607 | 8/1981 | Culleiton et al. | 423/137 |
| 4,297,326 | 10/1981 | Gjelsvik et al. | 423/132 |
| 4,297,327 | 10/1981 | Gjelsvik et al. | 423/132 |

FOREIGN PATENT DOCUMENTS

40525A/23 4/1977 German Democratic Rep. .

OTHER PUBLICATIONS

A. Landsberg, "Some Factors Affecting the Chlorination of Kaolinic Clay", Met. Trans. B. AIME 8B, Sep. 1977, p. 43.
Alder et al., "The Chlorination of Alumina: A Comparison of the Kinetics with Different Reduction Agents", Light Metal, 1979, p. 337.
K. B. Bengtson, "A Technology Comparison of Six Processes for the Production of Reduction-Grade Alumina from Non-Bauxitic Raw Material", Light Metal, Feb. 1979, p. 217, and references therein.
Landsberg, "Chlorination Kinetics of Aluminum Bearing Materials", Met. Trans. B. AIME 6B, Jun. 1975, p. 207.
D. Petzold et al., "Thermoanalytical Examinations for the Formation of Crystalline Al₂O₃-Forms in the Thermal Decomposition of Aluminum Chloride Hexahydrate", Mining College Freiberg, Apr. 1980, Chemistry Section.

*Primary Examiner*—Herbert T. Carter

[57] ABSTRACT

An improved process is provided for producing via ACH anhydrous aluminum chloride suitable for electrolytic reduction to aluminum wherein the feed ACH is acid leach derived. In a preferred embodiment the acid leach derived ACH is single stage crystallized.

10 Claims, No Drawings

METHOD OF PRODUCING ANHYDROUS ALUMINUM CHLORIDE FROM ACID LEACH-DERIVED ACH AND THE PRODUCTION OF ALUMINUM THEREFROM

BACKGROUND OF THE INVENTION

1. Field of the Invention

This invention relates to the production of anhydrous aluminum chloride from aluminous raw materials and, in particular, to an improved process of producing this material from acid leach-derived aluminum chloride hexahydrate (ACH) by dehydration of the ACH followed by reductive chlorination.

2. Brief Description of the Prior Art

It is known that anhydrous aluminum chloride can be electrolytically reduced at low temperatures of about 700°–750° C. to produce aluminum and chlorine with less energy consumption than with Hall technology reduction of alumina. Many processes have been proposed to economically produce anhydrous aluminum chloride in order to take advantage of the energy savings. Aluminum chloride useful in electrolytic cells must be essentially free of moisture. In addition, it must be of high purity.

U.S. Pat. No. 4,264,569 teaches a process for producing anhydrous aluminum chloride for use in electrolytic cells wherein the ACH is heated at a temperature range of 200°–450° C. until it is substantially dehydrated and thereafter reacting the dehydrated material in the presence of a gas mixture of chlorine, carbon monoxide, carbon dioxide and hydrogen to produce gaseous anhydrous aluminum chloride.

Heretofore, however, the prior art has failed to recognize the advantages to be obtained by selecting an acid-leach derived ACH.

SUMMARY OF THE INVENTION

According to the present invention there is provided an ACH starting material for subsequent dehydration and chlorination suitable for electrolytic reduction to aluminum which enables enhanced chlorination rates, which reduces chlorine consumption and which permits the use of both solid and gaseous reductants.

According to the present invention, an improved method of producing anhydrous aluminum chloride useful as a feed material for the electrolytic production of aluminum is provided. In the process of the present invention, ACH crystals derived by acid leaching of aluminous raw materials are dehydrated by calcination and reductively chlorinated to produce anhydrous aluminum chloride. Use of ACH prepared according to the present invention results in unexpectedly improved chlorination utilization and in addition permits the use of either solid or gaseous reducing agents in the preparation of anhydrous aluminum chloride.

The preferred method of preparing anhydrous aluminum chloride comprises the steps of:

(a) drying and calcining aluminous raw materials, such as clay, to activate the alumina fraction for HCl leaching;

(b) HCl leaching of calcined clay to dissolve the alumina fraction into soluble aluminum chloride;

(c) solid/liquid separation to obtain pregnant process liquor, typically by the use of settlers and/or filters;

(d) separation of any soluble iron chloride from process liquor;

(e) crystallization of pregnant process liquor to produce a separable slurry of aluminum chloride hexahydrate crystals;

(f) heating the aluminum chloride hexahydrate crystals to a temperature up to about 450° C. to substantially dehydrate them; and (g) reductively chlorinating said substantially dehydrated ACH crystals to form anhydrous aluminum chloride.

In a most preferred embodiment crystallization is by gas sparging.

DETAILED DESCRIPTION OF PREFERRED EMBODIMENT

Clay or other aluminious material undergoes acid leaching to dissolve the alumina containing fraction from the inert fraction of the material. Any aluminous ore or material may be used; however, clays or fly ash are preferred sources. The preferred ore is a domestic clay such as kalonite or kaolin. Preferably, prior to leaching the clay has been calcined to activate the clay so that it will leach in a minimum of time. The clay will leach even if not calcined, but at a much slower rate.

Clay from the mine may be dried if necessary to render it amenable to materials handling and particle size control following which, in a continuous operation, it is typically sent to covered storage. Clay withdrawn from storage is crushed/agglomerated as necessary. It next goes to calcination, which may be direct fired with any conventional fuel including powdered coal.

The rate of solution of clay in all acids is very greatly increased by calcination of the clay for 0.1–2 hrs in the temperature range 1200°–1500° F. The required residence time in calcination is therefore largely determined by the size of particles calcined and by the rate of heat transfer to individual particles. Calcination also removes free and combined water and destroys any organic materials which may be present in the clay as mined.

Typical mined clay has approximately the following analysis:

Moisture: 22.0%
Total $Al_2O_3$: 35.0% (dry basis)
Available $Al_2O_3$: 32.2%
Total $Fe_2O_3$: 1.15% (dry basis)
Available $Fe_2O_3$: 1.08%
Loss on Ignition: 11.75% (dry basis)

Clay fed to a grate-kiln system is preheated and dried. Following preheating, the dried clay flakes are calcined in the coal-fired kiln section for two hours. The hot calcine is cooled in a moving grate cooler which produces solids at a discharge temperature of about 85° F. for transfer to the leach tanks.

Alternatively, a coal-fired fluid-bed reactor could be used for calcining clay. Wet clay is reduced from −12 inch to −2 inch material in double roll cutters for storage. The material is conveyed to a non-clog hammer mill where the size is reduced to −¾ inch. The product is dried to 10–15 percent moisture in a rotary drier by off-gases from calcination in order to dry grind. This partially dried clay is further reduced to −20 mesh by dry grinding in an open-circuit rod mill or a cage mill, and then stored.

The calcination of the clay is effected in a three-stage, fluidized bed reactor using pulverized coal. The top bed operates at 250° F. and it receives and completely dries the clay. Supplemental heat can be added to this bed to assure that drying temperatures are maintained. Dried clay is calcined (at approximately 1200° F.) with coal combustion in the middle bed of the unit for about an hour. Heat recovery is accomplished by cooling the clay in the third (bottom) bed with incoming combustion air. The clay leaves the calciner unit at approximately 900° F. and is cooled to 150° F., by utilizing off-gases from the clay driers.

The leaching step dissolves the soluble alumina fraction from the inert fraction of the calcined clay using hydrochloric acid. Because some impurities are also dissolved this operation produces an impure solution or raw liquor of aluminum chloride and other chlorides, iron being the most important impurity, in a slurry with the insoluble residue. The principal chemical reactions taking place during leaching are:

$$(Al_2O_3 + 2SiO_2) + 6HCl \rightarrow 2AlCl_3 + 3H_2O + 2SiO_2$$

$$Fe_2O_3 + 6HCl \rightarrow 2FeCl_3 + 3H_2O$$

$$FeO + 2HCl \rightarrow FeCl_2 + H_2O$$

Calcined clay from storage is metered continuously, e.g. through a weighing-screw conveyor, into the first-stage leach tanks. Hydrochloric acid of 10 to 26 weight percent, preferably 20 to 26 weight percent, concentration is simultaneously metered into the leach tanks. Typically, a 10 gram per liter excess of HCl is maintained in the leach liquor leaving the final leach tank. Provision is made by means of a graphite heat exchanger to heat the entering acid to 140° F. when necessary. Optionally, this acid may be heated indirectly with steam, or with 225° F. slurry discharging from the leach tanks. Each leaching train consists of mechanically agitated vessels with agitation sufficient to keep solids suspended. The leach slurry flows from tank to tank continuously in each train. The total residence time is about three hours, during which time an extraction of about 92 percent is obtained. Although the above described leach process is a continuous process, the leaching can likewise be effected as a batch process.

The raw liquor, typically a boiling slurry at about 225° F. leaves the final leach tanks and goes to a two-stage vacuum flash cooling unit. The leach slurry then undergoes a solid/liquid separation to remove all solids from the solution of aluminum chloride before further processing. The cooled leach slurry discharged from the flash coolers is typically mixed with a flocculant and sent to one or more thickeners operating at about 115° F. The overflow from the last thickener passes to the first of two sets of filter presses, operated in series for final liquor clarification. The second-stage filter presses provide insurance against unclear liquor from the first stage because of poor operation. The filtrate or pregnant liquor has the following typical analysis results:

| Component | Percent by Weight |
|---|---|
| AlCl₃ | 17.73 |
| FeCl₃ | 0.46 |
| CaCl₂ | 0.06 |
| MgCl₂ | 0.06 |
| Others | 0.11 |
| HCl | 0.85 |
| H₂O | 80.73 |

Although the iron content in the above analysis is recorded in the ferric form, about 24 percent of it exists in the ferrous form. The underflow from the last thickener, at 30 percent solids, is pumped to rotary filters. The filter coolers, together with these obtained from liquor clarification are sent to tailing.

The removal of iron at this point is desirable to insure that it does not enter crystallization, thereby insuring its exclusion from the final product.

The first step in iron removal is quantitative oxidation of the iron to the ferric state in order to render it amenable to solvent extraction accomplished by means of elemental chlorine, which oxidizes ferrous iron very quickly according to the reaction $$Fe^{++} + \tfrac{1}{2}Cl_2 \rightarrow Fe^{+++} + Cl^-$$

Chlorine is injected into the pipeline carrying the pregnant liquor from the last-clarification filter press to the rubber-lined chlorinated pregnant solution tank. An organic, liquid-ion-exchange solvent is employed to extract the iron from the pregnant liquor in three stages of counter-current mixer/settling equipment. The iron content the pregnant liquor stream is reduced from 0.46 percent by weight to 34.5 parts per million. The contact time required is a few seconds. The organic liquid ion exchange is comprised of a mixture of decyl alcohol, kerosene, and a secondary or tertiary high-molecular-weight amine which is responsible for iron stripping. Volume proportions of make-up solvent are 2 percent amine, 9 percent decyl alcohol, and 89 percent kerosene. This mixture is treated with 20 percent hydrochloric acid to convert the amine into the amine-chlorine form required for solvent extraction. In a continuous operation the iron-free liquor is pumped to a storage tank which supplies the crystallization section. Iron-loaded organic solvent may be treated to regenerate the solvent.

After the leach liquor is separated from the residue and processed in a solvent extraction step to extract the iron component, the resultant pregnant liquor typically contains 25 to about 35 percent aluminum chloride hexahydrate. Two methods of obtaining substantially iron-free crystals which may be used are evaporation or HCl gas sparging. In case of evaporated crystallization, the aluminum chloride level in the iron-free pregnant liquor is concentrated by evaporation using a recirculating heat exchanger and vacuum flash system. The evaporator increases the aluminum chloride concentration from about 18.7 to about 29.0 percent by weight. This saturated stream enters the crystallizer where this stream flashes down to 192° F. Crystals of aluminum chloride hexahydrate (ACH) are formed in the crystallizer. In continuous operation of the crystallizer, the crystal concentration at the bottom is maintained at about 33 percent by volume using a standard settling test. Operation in this manner produces good quality crystals in the 10–20 mesh size range.

The ACH crystals may be separated from the crystallizer mother liquor in a separation section by either vacuum filtration or centrifuges. The crystals are thereafter washed with 35% hydrochloric acid, in which aluminum chloride has a very low solubility, to free them of adhering mother liquor. Mother liquor from centrifugation is split and a portion returned to the crystallizer feed tank. The remainder of the liquor is sent to a purge crystallizer which operates to control impurity levels in the system.

In a more preferred embodiment crystallization is effected by a gas-induced (sparging) technique which utilizes the common ion effect to reduce the solubility of ACH in the process liquor. Iron-free process liquor is evaporated to near saturation by using a recirculating heat exchanger and vacuum flash system similar to that used for evaporative crystallization. The evaporation increases the aluminum chloride concentration from 18.7 to about 31 percent by weight.

Concentrated aluminum chloride liquor and hydrogen chloride gas are introduced into the circulating loops of crystallizer (operating as 160° F.), to produce hydrochloric acid solutions supersaturated with ACH. The circulating liquors enter the bottom of the crystallizer magma chambers from the downcomer tubes and then flow upward through the fluidized crystal beds. Supersaturation of the solutions is relieved by both growth of ACH on the surface of existing crystals and the formulation of new nuclei.

Starting with a saturated aluminum chloride solution, ACH is crystallized as hydrogen chloride dissolves so as to maintain a virtually constant molality in the solution with respect to chloride until the aluminum chloride solubility is depressed to approximately 6.5% in the presence of 25.6% HCl. The solubility of aluminum chloride may be further depressed to about 0.7% at 35.5% HCl. The rate of HCl addition is controlled to constantly produce only the desired degree of supersaturation in the recirculation liquors.

Crystal slurry from each crystallization stage is pumped to centrifugal separators and washed. Washed crystals are sent to the decomposition or calcining section for conversion to activated alumina and residual chloride. Clarified mother liquor from the crystallization circuit are recycled to clay leaching. The remaining portion of the mother liquor stream is shipped to bleed treatment where additional ACH crystals are recovered and returned to the evaporator feed liquor.

A major purpose of aluminum chloride hexahydrate (ACH) crystallization is to separate aluminum from acid-soluble impurities. However, even though ACH tends to crystallize as a pure component, other elements in solution such as phosphorous and magnesium, may precipitate or co-crystallize to some degree and thus appear in the ACH. The presence of magnesium and phosphorous in the resultant product is not deleterious to the practice of the present invention. It should be noted, however, that where this acid-leach process has been utilized to prepare alumina as a feed material for Hall cell electrolytic production of aluminum, such impurities are unacceptable and result in the need for a second crystallization step unnecessary for practice of this invention.

Heretofore the end objective of clay processing was to produce alumina for Hall cell feed. Consequently in the past to achieve high purity alumina, the crystallized ACH was reprocessed to obtain a high purity product. The initial crystallized ACH washed and the liquor returned to the ore leach step. The washed ACH crystals were then redissolved in a pure HCl liquor and then recrystallized as before. The purified ACH by recrystallization was then dried and calcined to about 1000° C.-1280° C. to produce alumina for Hall cell feed and the HCl gas evolved from calcining the $AlCl_3 \cdot 6H_2O$ was typically collected in the spent liquor for leaching of more ore. A typical concentration level of impurities in single stage and recrystallized ACH is shown in Table A along with Bayer alumina for comparison.

TABLE A

Typical Impurity Concentration in ACH From Single Stage and Double Stage Crystallization VS Bayer Alumina Cell Feed

| Impurities | Single Stage ACH* | Recrystallized ACH* | Bayer $Al_2O_3$ |
|---|---|---|---|
| $P_2O_5$ | .024 | .0009 | .001 |
| MgO | .013 | .0009 | .002 |
| $Cr_2O_3$ | .004 | .00024 | .002 |
| MnO | .0014 | .0009 | .002 |
| $V_2O_5$ | .0005 | .0005 | .002 |
| $TiO_2$ | .0005 | .0005 | .005 |
| $K_2O$ | .0038 | .0009 | .005 |
| NiO | .005 | .005 | .005 |
| CuO | .0014 | .0014 | .01 |
| $Fe_2O_3$ | .013 | .018 | .015 |
| $SiO_2$ | .004 | .002 | .015 |
| ZnO | .0009 | .0015 | .02 |
| CaO | .004 | .004 | .04 |
| $Na_2O$ | .0028 | .0014 | .4 |

*Impurity concentrations in ACH are reported on the basis of weight percent in $Al_2O_3$.

From Table A it can be seen that calcining single stage crystallized ACH will produce alumina with higher $P_2O_5$, MgO and $Cr_2O_3$, than Bayer alumina which makes the product unacceptable as feed material for the Hall cell. This is primarily due to the high $P_2O_5$, since it is well established that the current efficiency of the aluminum electrolysis in Hall cell diminishes by about 1% for every 0.01% phosphorous concentration in the electrolyte. Calcined recrystallized ACH produces acceptable alumina as a feed for Hall cell but at the added capital and energy cost of the recrystallizer. It has been found that single stage crystallized ACH can be used as a feed material to produce anhydrous $AlCl_3$ according to the present invention with no deleterious effect of phosphorous in the final electrolysis step.

The ACH crystalline product is then calcined, i.e. thermally decomposed into active aluminous and a hydrochloric acid-water vapor stream, in the temperature range of 200° C. to 450° C. according to the teaching of the prior art. The main decomposition reaction is:

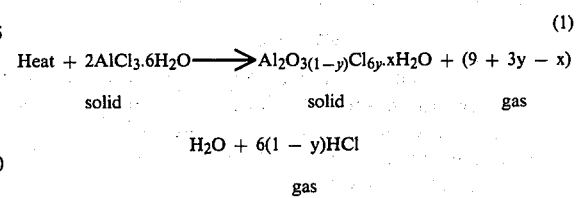

(1)

The liberated HCl is advantageously recovered for reuse in the leaching process. The single crystallized ACH product may be dehydrated using a rotary kiln, a fluidized bed or flash calciner.

The partially calcined ACH is then chlorinated in the presence of one or more reductants by conventional methods, e.g. reacting the dehydrated material at a temperature of about 350° to 1000° C., preferably at 3500° to about 600° C. The reductive chlorination reaction is as follows:

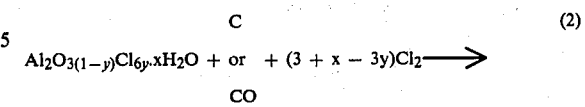

(2)

$$2AlCl_3 + 2xHCl + \begin{matrix} CO \\ \text{or} \\ CO_2 \end{matrix}$$

The reductant (C or CO), oxygen ($O_{3(1-y)}$, $xO$) and carbon oxides ($CO,CO_2$) balance in the above representative equation is a function of temperature and accordingly are not balanced. Chlorination of dehydrated acid leach-derived ACH of the present invention can be effected using either gaseous reductions, i.e. carbon monoxide, carbon dioxide, hydrogen and mixtures thereof or with solid reductants, such as fully or partially calcined petroleum coke and activated carbon from coal or other sources. The HCl produced from the reductive chlorination is typically processed to recover the chlorine value in known processes, such as the Kel-Chlor process.

The anhydrous aluminum chloride produced may then be electrolytically reduced to aluminum and chlorine by known methods, such as in the bipolar cell taught in U.S. Pat. No. 3,755,099 and 4,151,061. Chlorine from the cell and/or chlorine recovered from the HCl produced during chlorination may advantageously be recycled for use in the chlorinator.

The following examples are offered by way of illustration and not by way of limitation.

EXAMPLE 1

Commercially available American Hoechst ACH (100 grams) was calcined in a rotary kiln for 2 hours at a temperature of 400° C. A 15 gm sample of the dehydrated ACH obtained was thereafter chlorinated in a 1" fluid bed reactor using chlorine gas as the chlorinating agent. Petroleum coke (3 gm of −100 mesh) which had been partially calcined by heating in a rotary kiln for 30 minutes at 650° C. with 200 cc/min nitrogen was used as the reductant. The procedure was repeated with a second sample. The chlorination rates measured were as follows:

Run 1A: 0.0004 gm $AlCl_3$/min; Run 1B: 0.02 gm $AlCl_3$/min

EXAMPLE 2

Commercially available American Hoechst ACH was dehydrated and chlorinated according to the procedure of Example 1 except that carbon monoxide was utilized as the reducing agent. The results obtained from two separate runs were as follows:

R 2A: 0.01 gm $AlCl_3$/min; Run 2B: 0.01 gm $AlCl_3$/min.

EXAMPLE 3

Acid leach-derived ACH prepared according to the present invention from kaolin clay from east central Georgia was calcined in a rotary kiln for 2 hours at 400° C. The partially calcined ACH was then chlorinated in a 1" fluid bed reactor at 550° C. using chlorine gas as the chlorinating agent and the partially calcined petroleum coke of Example 1 as the reducing agent. The results obtained from two separate runs were as follows:

Run 3A: 0.089 gm $AlCl_3$/min; Run 3B: 0.086 gm $AlCl_3$/min.

EXAMPLE 4

The acid leach-derived ACH of Example 3 was calcined and chlorinated according to the procedures of Example 3 except that carbon monoxide was used as the reducing agent. The results obtained from two separate runs were as follows:

Run 4A: 0.086 gm $AlCl_3$/min; Run 4B: 0.096 gm $AlCl_3$/min.

Although the foregoing invention has been described in some detail by way of illustration and example for purposes of clarity and understanding, it will be obvious that certain changes and modifications may be practiced within the scope of the invention, as limited only by the scope of the appended claims.

What is claimed is:

1. A method of producing aluminum by electrolytically reducing anhydrous aluminum chloride from iron and phosphorous or magnesium-containing aluminum hexahydrate crystals comprising:
    (a) leaching aluminous raw material containing phosphorous or magnesium with a hydrochloric acid leach liquor to dissolve the alumina fraction into soluble aluminum chloride;
    (b) separating said leach liquor from any solids present;
    (c) removing all soluble iron chloride from said liquor to obtain a substantially iron free, aluminum hloride-containing pregnant liquor;
    (d) crystallizing said pregnant liquor to produce a separable slurry of phosphorous or magnesium-containing aluminum hexahydrate (ACH) crystals;
    (e) heating said phosphorous or magnesium-containing ACH crystals from said slurry to a temperature of about 200° C. to 450° C. to produce partially calcined ACH (PCACH);
    (f) chlorinating said PCACH in the presence of chlorine and a reductant to produce said anhydrous aluminum chloride; and
    (g) electrolytically reducing said anhydrous aluminum chloride to produce aluminum and chlorine.

2. A method according to claim 1 wherein said aluminous material is clay.

3. A method according to claim 2 wherein said clay is calcined prior to said leaching.

4. A method according to claim 1 wherein said reductant is gaseous.

5. A method according to claim 4 wherein said reductant is selected from the group consisting of carbon monoxide, hydrogen, carbon dioxide and mixtures thereof.

6. A method according to claim 1 wherein said reductant is solid.

7. A method according to claim 6 wherein said reductant is partially calcined petroleum coke.

8. A method according to claim 1 wherein said crystallizing of step (d) comprises single stage crystallization and the ACH crystals of step (e) are said single stage crystals.

9. In a method of producing aluminum by electrolytic reduction of anhydrous aluminum chloride obtained from aluminum chloride hexahydrate (ACH) by a process comprising heating said ACH to a temperature of about 200° to about 450° C. thereafter reductively chlorinating in the presence of a gaseous mixture of chlorine and one or more gaseous reductants, the improvement comprising forming said anhydrous aluminum chloride from ACH obtained by a method comprising:
    (a) leaching aluminous raw material containing iron and phosphorous or magnesium with a hydrochloric acid leach liquor to dissolve the alumina fraction into soluble aluminum chloride;
(b) separating said leach liquor from any solids present;
(c) removing any soluble iron chloride present from said liquor by solvent extraction to obtain a substantially iron-free pregnant liquor;
(d) crystallizing said pregnant liquor to produce a separable slurry of phosphorous or magnesium-containing aluminum chloride hexahydrate (ACH) crystals.

10. The improvement according to claim 9 wherein said crystallizing of step (d) comprises single stage crystallization and said ACH comprises single stage crystals.

* * * * *